United States Patent
Ito et al.

(10) Patent No.: US 10,995,662 B2
(45) Date of Patent: May 4, 2021

(54) COMBUSTION DEVICE AND GAS TURBINE

(71) Applicant: IHI Corporation, Tokyo (JP)

(72) Inventors: Shintaro Ito, Tokyo (JP); Soichiro Kato, Tokyo (JP); Masahiro Uchida, Tokyo (JP); Shogo Onishi, Tokyo (JP); Taku Mizutani, Tokyo (JP); Tsukasa Saitou, Tokyo (JP); Toshiro Fujimori, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/524,627

(22) Filed: Jul. 29, 2019

(65) Prior Publication Data

US 2019/0345873 A1     Nov. 14, 2019

Related U.S. Application Data

(63) Continuation of application No. PCT/JP2018/002883, filed on Jan. 30, 2018.

(30) Foreign Application Priority Data

Jan. 31, 2017 (JP) .............................. JP2017-016232

(51) Int. Cl.
| | |
|---|---|
| *F01N 3/00* | (2006.01) |
| *F02C 3/30* | (2006.01) |
| *B01D 53/90* | (2006.01) |
| *F23R 3/14* | (2006.01) |
| *F23R 3/40* | (2006.01) |
| *F23L 7/00* | (2006.01) |

(52) U.S. Cl.
CPC ................ *F02C 3/30* (2013.01); *B01D 53/90* (2013.01); *F23R 3/14* (2013.01); *F23R 3/40* (2013.01); *B01D 2251/2062* (2013.01); *F23L 7/00* (2013.01)

(58) Field of Classification Search
CPC ...... F23K 5/00; F02C 3/30; F23R 3/40; F23R 3/14; B01D 53/90; B01D 53/86; F23L 7/00; F23J 15/003
USPC .......................................................... 60/286
See application file for complete search history.

(56) References Cited

U.S. PATENT DOCUMENTS

| | | | |
|---|---|---|---|
| 4,928,481 A | 5/1990 | Joshi et al. | |
| 5,199,255 A | 4/1993 | Sun et al. | |
| 5,809,910 A | 9/1998 | Svendssen | |
| 9,631,815 B2 * | 4/2017 | Antoniono | ................ F23R 3/10 |
| 9,869,226 B2 * | 1/2018 | Broderick | ............... F01N 3/208 |
| 2010/0061907 A1 | 3/2010 | Sun et al. | |
| 2011/0056191 A1 | 3/2011 | Ono et al. | |
| 2011/0061374 A1 * | 3/2011 | Noritake | ............... F01N 3/2066 |
| | | | 60/286 |

(Continued)

FOREIGN PATENT DOCUMENTS

| | | |
|---|---|---|
| CA | 2231749 A1 | 9/1998 |
| CN | 101909725 A | 12/2010 |

(Continued)

*Primary Examiner* — Jason D Shanske
(74) *Attorney, Agent, or Firm* — Rothwell, Figg, Ernst & Manbeck, P.C.

(57) ABSTRACT

The combustion device includes: a combustion chamber in which fuel is combusted using combustion air; and a reducing agent injector that injects a reducing agent toward flames in the combustion chamber.

6 Claims, 2 Drawing Sheets

(56) References Cited

U.S. PATENT DOCUMENTS

| | | | |
|---|---|---|---|
| 2014/0331678 A1* | 11/2014 | Cramer | F23R 3/28 60/746 |
| 2015/0315033 A1* | 11/2015 | Gerhart | F01N 3/206 60/274 |
| 2016/0003156 A1* | 1/2016 | Hanson | F02C 7/222 239/408 |

FOREIGN PATENT DOCUMENTS

| | | |
|---|---|---|
| CN | 101970819 A | 2/2011 |
| JP | 57-47108 A | 3/1982 |
| JP | 06-341610 A | 12/1994 |
| JP | 10-73254 A | 3/1998 |
| JP | 10-259736 A | 9/1998 |
| JP | 2015-094496 A | 5/2015 |
| JP | 2016-191507 A | 11/2016 |

\* cited by examiner

COMBUSTION DEVICE AND GAS TURBINE

CROSS-REFERENCE TO RELATED APPLICATIONS

This application is a Continuation Application based on International Application No. PCT/JP2018/002883, filed Jan. 30, 2018, which claims priority on Japanese Patent Application No. 2017-016232, filed Jan. 31, 2017, the contents of which are incorporated herein by reference.

TECHNICAL FIELD

The present disclosure relates to a combustion device and a gas turbine.

BACKGROUND

Patent Document 1 shown below discloses a combustion device and a gas turbine that combust ammonia as fuel. That is, the combustion device and the gas turbine obtain combustion exhaust gas that drives a turbine, by pre-mixing natural gas with ammonia (ammonia for fuel) and by supplying it to a combustor, and form a reduction area on the downstream side in the combustor to reduce nitrogen oxide (NOx) produced in the combustion area using ammonia in order to decrease the nitrogen oxide (NOx).

DOCUMENT OF RELATED ART

Patent Document

[Patent Document 1] Japanese Unexamined Patent Application, First Publication No. 2016-191507

SUMMARY

Technical Problem

Incidentally, in the technology of Patent Document 1 described above, the nitrogen oxide (NOx) produced on the upstream side in the combustor is reduced to nitrogen ($N_2$) by being mixed with ammonia on the downstream side therein, but the ammonia may not always efficiently act as a reducing agent, and the reduction efficiency of the nitrogen oxide (NOx) by ammonia may not be high.

The present disclosure is made in view of the above circumstances, and an object thereof is to further improve the reduction efficiency of nitrogen oxide (NOx) by a reducing agent than before.

Solution to Problem

In order to obtain the above object, a first aspect of the present disclosure is a combustion device including: a combustion chamber in which fuel is combusted using combustion air; and a reducing agent injector that injects a reducing agent toward flames in the combustion chamber.

A second aspect of the present disclosure is that in the combustion device of the first aspect, the reducing agent injector is configured to inject the reducing agent to an area of the flames in which an oxygen concentration thereof is low.

A third aspect of the present disclosure is that in the combustion device of the first aspect, the reducing agent injector is configured to inject the reducing agent toward a center portion of the flames, the center portion being at a center of the flames in a mainstream direction in the combustion chamber.

A fourth aspect of the present disclosure is that in the combustion device of any one of the first to third aspects, the reducing agent injector includes one or a plurality of injection holes provided around the flames and is configured to inject the reducing agent from the one or the plurality of injection holes toward the flames.

A fifth aspect of the present disclosure is that in the combustion device of any one of the first to fourth aspects, the combustion chamber is configured such that the combustion air forms a swirling flow thereinside, and the reducing agent injector is configured to inject the reducing agent in a direction along the swirling flow and along a plane perpendicular to a mainstream direction in the combustion chamber.

A sixth aspect of the present disclosure is that in the combustion device of any one of the first to fifth aspects, the reducing agent is ammonia.

A seventh aspect of the present disclosure is a gas turbine including the combustion device of any one of the first to sixth aspects.

Effects

According to the present disclosure, since the reducing agent is injected toward the flames in the combustion chamber, it is possible to further improve the reduction efficiency of nitrogen oxide (NOx) by ammonia than before.

DESCRIPTION OF EMBODIMENTS

Hereinafter, an embodiment of the present disclosure will be described with reference to the drawings.

Figure 1:
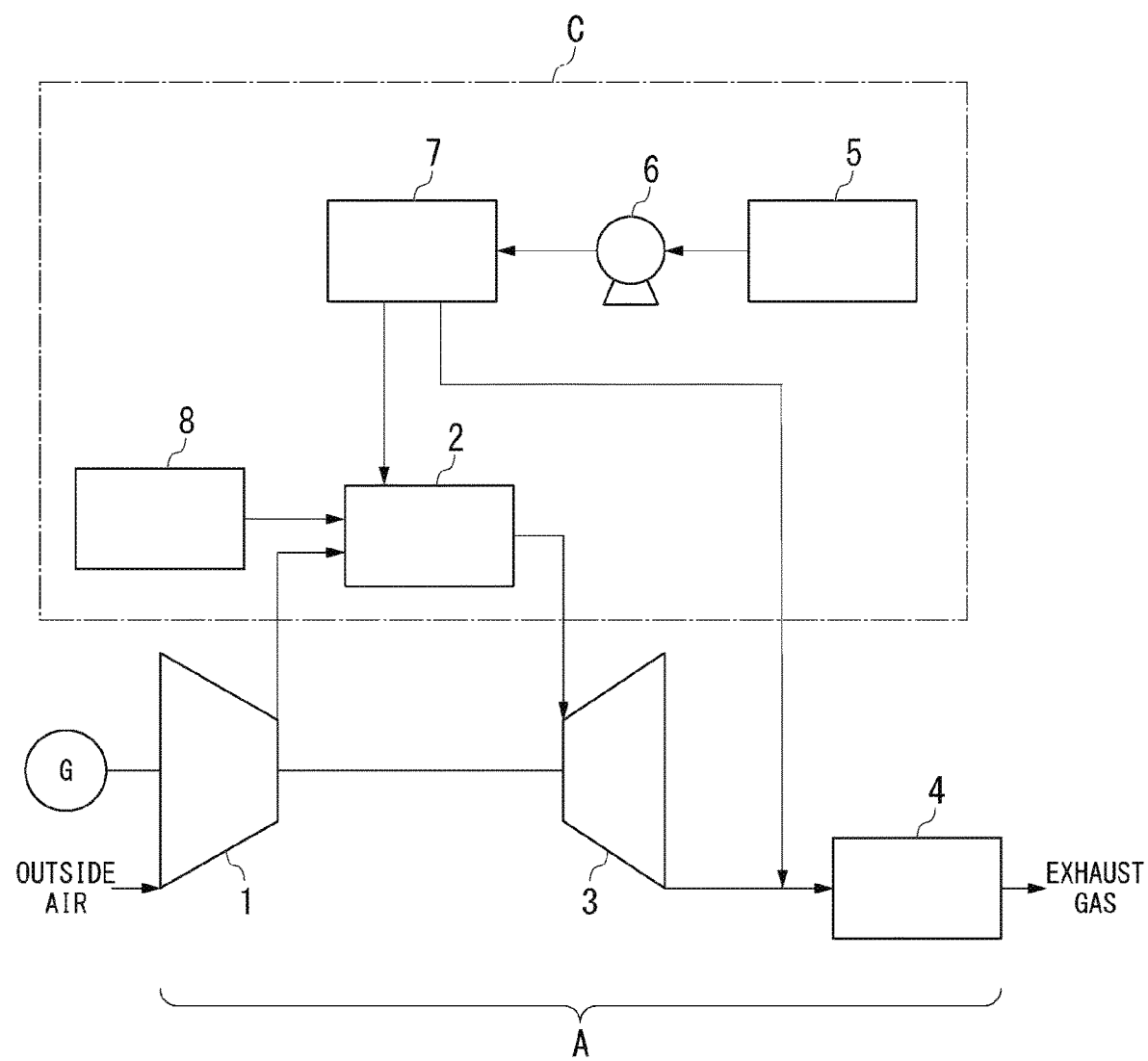
FIG. 1 is a block diagram showing an overall configuration of a combustion device and a gas turbine of an embodiment of the present disclosure.

As shown in FIG. 1, a gas turbine A of this embodiment includes a compressor 1, a combustor 2, a turbine 3, a reduction catalyst chamber 4, a tank 5, a pump 6, a vaporizer 7 and a fuel supplier 8. Among these components, the combustor 2, the tank 5, the pump 6, the vaporizer 7 and the fuel supplier 8 configure a combustion device C of this embodiment. That is, the gas turbine A includes the combustion device C. The gas turbine A of this embodiment is a drive source for an electric generator G and generates rotational motive force by combusting a predetermined fuel. Note that the gas turbine of the present disclosure may be used for other than the driving source for the electric generator. The above fuel is not particularly limited as long as it can be used for the combustor 2.

The compressor 1 compresses air (outside air) taken in from the outside to a predetermined pressure to produce compressed air. The compressor 1 supplies the combustor 2 with the compressed air mainly as combustion air. The combustor 2 produces combustion gas by combusting fuel using the compressed air as an oxidizing agent and supplies the combustion gas to the turbine 3.

The turbine 3 generates rotational motive force by using the above combustion gas as driving gas.

The turbine 3 is axially connected to the compressor 1 and the electric generator G as shown in FIG. 1 and rotationally drives the compressor 1 and the electric generator G by its own rotational motive force. The turbine 3 discharges the combustion gas after power recovery to the reduction catalyst chamber 4. The reduction catalyst chamber 4 is internally filled with reduction catalysts and reduces nitrogen oxide (NOx) contained in the combustion gas to nitrogen ($N_2$).

The tank 5 is a fuel tank that stores a predetermined amount of liquid ammonia and supplies the liquid ammonia to the pump 6. The pump 6 is a fuel pump that pressurizes the liquid ammonia supplied from the tank 5 to a predetermined pressure and supplies the pressurized liquid ammonia to the vaporizer 7. The vaporizer 7 produces gaseous ammonia by vaporizing the liquid ammonia supplied from the pump 6.

The vaporizer 7 supplies the gaseous ammonia as a reducing agent to the combustor 2 and to a further upstream line immediately than the reduction catalyst chamber 4. The reduction catalyst chamber 4 reduces the nitrogen oxide (NOx) by the cooperation between the reduction catalysts stored thereinside and the reducing agent.

Among these components, the combustor 2 that is the most characteristic component in the gas turbine A and the combustion device C of this embodiment will be described in detail with reference to FIGS. 2A and 2B.

Figure 2A:
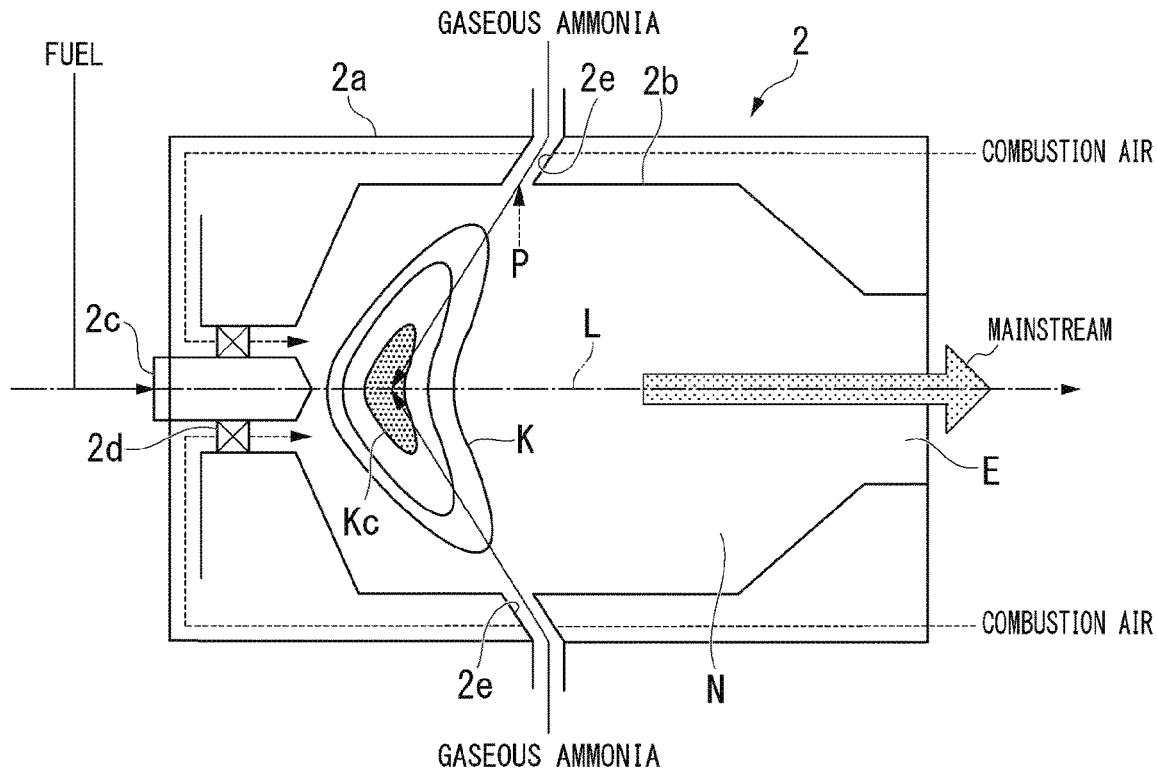
FIG. 2A is a longitudinal cross-sectional view showing a configuration of a combustor of the embodiment of the present disclosure.

As shown in FIG. 2A, the combustor 2 includes a casing 2a, a liner 2b, a fuel nozzle 2c, a flow adjuster 2d and a plurality of injection holes 2e. Note that the tank 5, the pump 6, the vaporizer 7, and the plurality of injection holes 2e described above configure a reducing agent injector of the present disclosure. That is, the combustion device C includes the reducing agent injector.

The casing 2a is a substantially cylindrical container that accommodates the liner 2b. One end in the central axis direction of the casing 2a is attached with the fuel nozzle 2c and the flow adjuster 2d, and the other end thereof is provided with an exhaust port E. The liner 2b is a cylindrical body provided substantially coaxially with the casing 2a, and the internal space of the liner 2b is used for a combustion chamber N. The combustion chamber N may be referred to as the combustion chamber of the combustor 2. Note that the direction of the central axis L (the direction in which the central axis L extends) of the liner 2b shown in FIGS. 2A and 2B is the same as the flow direction (the mainstream direction) of the mainstream in the combustion chamber N (the mainstream of gas in the combustion chamber N). FIG. 2A is a longitudinal cross-sectional view of the combustor 2, and this longitudinal cross-sectional view denotes a cross-sectional view in the mainstream direction.

The fuel nozzle 2c is provided in the central axis L of the liner 2b at one end of the casing 2a and is a fuel injection nozzle that injects fuel into the combustion chamber N. The flow adjuster 2d is annularly provided around the fuel nozzle 2c at the one end of the casing 2a, supplies combustion air from one end (the upstream end in the mainstream direction) of the combustion chamber N toward the exhaust port E, and forms a swirling flow S of the combustion air around the central axis L of the liner 2b as shown in FIG. 2B. That is, the combustion chamber N of the combustor 2 is configured such that the combustion air forms the swirling flow S thereinside. FIG. 2B is a transverse cross-sectional view of the combustor 2, and this transverse cross-sectional view denotes a cross-sectional view in an orthogonal direction to the mainstream direction.

The plurality of injection holes 2e are circular through-holes formed from the casing 2a to the liner 2b and are provided around the central axis L, namely, around flames K, such that two adjacent injection holes form a predetermined angle. That is, the injection holes 2e are ammonia injection holes that inject gaseous ammonia from the inner surface of the liner 2b toward the flames K. In other words, the plurality of injection holes 2e are provided in the combustor 2 and are disposed at intervals in the circumferential direction around the central axis of the combustor 2. The plurality of injection holes 2e are configured to inject gaseous ammonia into the combustion chamber N of the combustor 2, and in other words, are configured to inject gaseous ammonia toward a flame-forming area in which flames are formed in the combustion chamber N of the combustor 2.

The flames K are an area in which the oxygen concentration thereof is relatively low in the combustion chamber N, and the center portion Kc thereof is an area in which the oxygen concentration thereof is the lowest in the flames K. As shown in FIG. 2A, the plurality of injection holes 2e inject gaseous ammonia toward the center portion Kc of the flames K, which is at the center of the flames K in the mainstream direction, namely, toward an area in which the oxygen concentration thereof is the lowest. In other words, the plurality of the injection holes 2e inject gaseous ammonia toward an area of the flame-forming area in which the oxygen concentration thereof is low, and in further other words, inject gaseous ammonia toward a center portion of the flame-forming area positioned at the center of the flame-forming area in the mainstream direction. The center portion Kc of the flames K is not one point but an area having a predetermined spread as shown in FIG. 2A.

The maximum penetration distance $Y_{max}$ of the gaseous ammonia is given by the following equation (1). That is, the maximum penetration distance $Y_{max}$ is given as a relational expression (1) between the inner diameter $d_j$ of the injection hole 2e, the injection velocity $U_j$ of the gaseous ammonia, the density $\rho_j$ of the gaseous ammonia, the flow velocity $U_g$ (the mainstream velocity) of the mainstream in the combustion chamber N, the density $\rho_g$ of the mainstream, and the inclusion angle 0 (unit: °) of the injection direction with respect to the direction (the plane perpendicular to the mainstream direction) orthogonal to the direction of the central axis L (the mainstream direction) as shown in FIG. 2A.

$$Y_{max} = 1.15 d_j \left( \frac{\rho_j U_j^2}{\rho_2 U_g^2} \right) \sin(90° - \theta) \qquad (1)$$

The inner diameter $d_j$ and the flow velocity $U_g$ (the mainstream velocity) are set such that the maximum penetration distance $Y_{max}$ is greater than the distance from the tip position P (the position closer to the combustion chamber N) of the injection hole 2e to the center of the flames K. By setting in this way, the gaseous ammonia injected from the injection holes 2e can be caused to reliably reach the center of the flames K (the center portion of the flame-forming area).

Figure 2B:
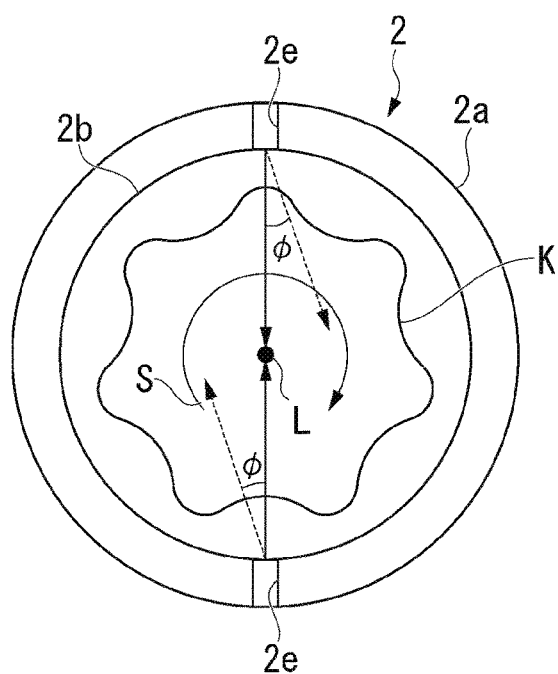
FIG. 2B is a transverse cross-sectional view showing the configuration of the combustor of the embodiment of the present disclosure.

As shown by the arrows of dashed lines in FIG. 2B, the injection direction of the injection hole 2e around the flames K (the central axis L) is not set to be directed to the center (the central axis L) of the flames K, but the gaseous ammonia may be injected in a direction along the swirling flow S when viewed from a plane perpendicular to the mainstream direction in the combustion chamber N, that is, to be injected in an injection direction inclined by an angle φ downstream of the swirling direction with respect to the direction orthogonal to the swirling direction of the swirling flow S. In other words, the injection direction of the injection hole 2e may be set to be directed downstream in the swirling direction of the swirling flow S when viewed in the mainstream direction.

Next, the time-series operation (regular operation) of the gas turbine A and the combustion device C of this embodiment will be described in detail.

In the gas turbine A and the combustion device C, liquid ammonia is supplied from the tank 5 to the vaporizer 7 by the operation of the pump 6 and is vaporized at the vaporizer 7 to produce gaseous ammonia. Then, this gaseous ammonia is supplied to each of the injection holes 2e of the combustor 2 and to a further upstream line immediately than the reduction catalyst chamber 4. In addition, fuel is supplied from the fuel supplier 8 to the vaporizer 7 and is injected from the fuel nozzle 2c into the combustion chamber N.

On the other hand, compressed air is supplied as combustion air to the flow adjuster 2d of the combustor 2 by the operation of the compressor 1. The combustion air is jetted by the flow adjuster 2d in the direction along the central axis L of the liner 2b as the swirling flow S that swirls around the central axis L of the liner 2b.

The combustion air is initially jetted from the flow adjuster 2d in the direction of the central axis L of the liner 2b and gradually spreads outward in the orthogonal direction to the central axis L, namely, toward the liner 2b positioned in the side, by the centrifugal force due to the swirling. In addition, the fuel injected from the fuel nozzle 2c gradually spreads outward in the orthogonal direction to the central axis L similar to the combustion air by accompanying the flow of the combustion air. Then, the fuel and the combustion air flowing in the combustion chamber N are mixed together, whereby the flames K are formed in the combustion chamber N.

The flames K are formed such that the center thereof corresponds to the central axis L of the liner 2b, and due to the flow of the fuel and the combustion air described above, the end of the flames K in the direction of the central axis L (the downstream end in the mainstream direction) approaches the exhaust port E (the front) as it goes away from the central axis L as shown in FIGS. 2A and 2B. That is, the flame-forming area is a curved area that is convex upstream in the mainstream direction in a cross-sectional view (FIG. 2A) including the central axis of the combustor 2. Each of the injection holes 2e provided in the combustor 2 injects gaseous ammonia to the flames K in a direction crossing the central axis L (from the side).

That is, in this embodiment, since gaseous ammonia is injected from the plurality of injection holes 2e toward the center of the flames K in which the oxygen concentration thereof is the lowest in the combustion chamber N, it is possible to make gaseous ammonia efficiently act on the nitrogen oxide (NOx) produced in the flames K, and thus to further improve the reduction efficiency (decrease efficiency) of the nitrogen oxide (NOx) by gaseous ammonia than before.

In addition, the injection velocity of the gaseous ammonia at each injection hole 2e is set such that the gaseous ammonia reaches the center of the flames K. Accordingly, unreacted gaseous ammonia is easily supplied to the inside of the flames K suitable for reduction, and as a result, the reduction efficiency of the nitrogen oxide (NOx) can be improved.

Furthermore, when the injection direction around the flames K (the central axis L) is inclined downstream in the swirling direction by the angle φ, the reduction efficiency of the nitrogen oxide (NOx) can be improved compared to a case where the injection direction is orthogonal to the swirling direction or is inclined upstream in the swirling direction.

It is supposed that this is because since the relative velocity between the gaseous ammonia and the combustion air or the combustion gas in a case where the injection direction of the gaseous ammonia is inclined downstream in the swirling direction becomes less than that in a case where the injection direction is orthogonal to the swirling direction or is inclined upstream in the swirling direction, the gaseous ammonia is limited from being mixed with the combustion air or the combustion gas without reaching the inside of the flames K and easily reaches the inside of the flames K, and as a result, the reduction efficiency of the nitrogen oxide (NOx) by gaseous ammonia can be improved.

Hereinbefore, the embodiment of the present disclosure is described with reference to the attached drawings, but the present disclosure is not limited to the above embodiment. The shapes, combinations and the like of the components described in the above embodiment are merely examples, and addition, omission, replacement, and other modifications of the configuration can be adopted based on design requirements and the like within the scope of the present disclosure. For example, the following modifications can be considered.

(1) The above embodiment relates to a case where the present disclosure is applied to the combustion device C of the gas turbine A, but the present disclosure is not limited thereto. The combustion device of the present disclosure is also applicable to various apparatuses other than the gas turbine A, for example, to a case where a liner is inclined with respect to the central axis L or to a boiler or the like in which the mainstream is curved.

(2) In the above embodiment, gaseous ammonia is used as the reducing agent, but the present disclosure is not limited thereto. Reducing agents other than gaseous ammonia may be used.

(3) In the above embodiment, the plurality of injection holes 2e are provided, but the present disclosure is not limited thereto. That is, the number of the injection hole 2e may be single (one).

(4) The injection position of gaseous ammonia in the direction of the central axis L of the liner 2b is set at one position, but the present disclosure is not limited thereto. In order to improve the reduction efficiency of nitrogen oxide (NOx), gaseous ammonia may be injected from a plurality of positions in the direction of the central axis L of the liner 2b. In this case, since the gaseous ammonia can act on a wider area of the flames K in the direction (the mainstream direction) of the central axis L, further improvement in the reduction efficiency of nitrogen oxide (NOx) is expected.

(5) In the above embodiment, the plurality of injection holes 2e are circular through-holes. That is, the cross-sectional shape of the injection hole 2e is circular, but the present disclosure is not limited thereto. The cross-sectional shape of the injection hole 2e may be a shape other than a circle, for example, an oval or an ellipse whose major axis is in the direction of the central axis L (the mainstream direction). In a case where such an oval shape or an ellipse shape is adopted, the projected area thereof for the swirling flow is decreased, and the amount of gaseous ammonia, which is mixed with the swirling flow without reaching the inside of the flames K and is discharged to the exhaust port E, can be decreased, whereby further improvement in the reduction efficiency of nitrogen oxide (NOx) is expected.

What is claimed is:

1. A combustion device comprising:
a combustor in which a combustion chamber in which fuel is combusted using combustion air is formed wherein
the combustor includes:
a reducing agent injector that injects a reducing agent toward flames in the combustion chamber;
a liner having an internal space used as the combustion chamber;
a casing accommodating the liner;
a fuel nozzle configured to inject the fuel into the combustion chamber; and
a flow adjuster which is annularly provided around the fuel nozzle at one end of the casing and is configured to supply the combustion air from one end of the combustion chamber and to form a swirling flow of the combustion air inside the combustion chamber, and
the reducing agent injector is configured to inject the reducing agent n a direction along the swirling flow formed by the flow adjuster when viewed from a plane perpendicular to a mainstream direction in the combustion chamber.

2. The combustion device according to claim 1, wherein the reducing agent injector is configured to inject the reducing agent to an area of the flames in which an oxygen concentration thereof is lower than other areas of the flames.

3. The combustion device according to claim 1, wherein the reducing agent injector is configured to inject the reducing agent toward a center portion of the flames, the center portion being at a center of the flames in a mainstream direction in the combustion chamber.

4. The combustion device according to claim 1, wherein reducing agent injector includes one or a plurality of injection holes provided around the flames and is configured to inject the reducing agent from the one or the plurality of injection holes toward the flames.

5. The combustion device according to claim 1, wherein the reducing agent is ammonia.

6. A gas turbine comprising the combustion device according to claim 1.

* * * * *